(12) United States Patent
Goodenough et al.

(10) Patent No.: US 8,491,824 B2
(45) Date of Patent: Jul. 23, 2013

(54) CONTACT LENS MOLDS AND SYSTEMS AND METHODS FOR PRODUCING SAME

(75) Inventors: Neil G. Goodenough, Southampton (GB); Gregg A. Dean, Southampton (GB)

(73) Assignee: Cooper Vision International Holding Company, LLP, St. Michael (BB)

(*) Notice: Subject to any disclaimer, the term of this patent is extended or adjusted under 35 U.S.C. 154(b) by 265 days.

(21) Appl. No.: 12/802,660

(22) Filed: Jun. 10, 2010

(65) Prior Publication Data

US 2010/0258963 A1 Oct. 14, 2010

Related U.S. Application Data

(63) Continuation of application No. 11/921,427, filed as application No. PCT/US2006/030685 on Aug. 7, 2006, now Pat. No. 7,780,881, which is a continuation-in-part of application No. 11/200,848, filed on Aug. 9, 2005, now Pat. No. 7,320,587.

(51) Int. Cl.
*B29D 11/00* (2006.01)

(52) U.S. Cl.
USPC ............................................ 264/2.5

(58) Field of Classification Search
CPC ............................ B29D 11/005; B29D 11/0048
USPC ............................................ 264/2.5
See application file for complete search history.

(56) References Cited

U.S. PATENT DOCUMENTS

| 4,565,348 A | 1/1986 | Larsen |
| 4,640,489 A | 2/1987 | Larsen |
| 5,114,455 A | 5/1992 | Hirota et al. |
| 5,158,718 A | 10/1992 | Thakrar et al. |
| 5,204,126 A | 4/1993 | Singh et al. |
| 5,252,056 A | 10/1993 | Hörner et al. |
| 5,407,627 A | 4/1995 | Schiller et al. |
| 5,451,155 A | 9/1995 | Kok et al. |
| 5,466,147 A | 11/1995 | Appleton et al. |

(Continued)

FOREIGN PATENT DOCUMENTS

| EP | 1136222 A1 | 9/2001 |
| EP | 1352736 A1 | 10/2003 |

(Continued)

OTHER PUBLICATIONS

"ACLens", "How to Read Your Contact Lens Prescription", http://www.aclens.com/prescriptionhelp.asp.*

(Continued)

*Primary Examiner* — Yogendra Gupta
*Assistant Examiner* — Alison Hindenlang
(74) *Attorney, Agent, or Firm* — Stout, Uxa, Buyan & Mullins; Frank J. Uxa

(57) ABSTRACT

Contact lens molds and systems and methods for producing contact lens molds are described. The contact lens mold sections include two optical quality surfaces, a flange circumscribing at least a portion of the two optical quality surfaces, and an elongate member extending from the flange. Two mold sections can contact one another to form a mold assembly having a contact lens shaped cavity. The mold sections are structured to form a contact lens having an edge that does not require further physical modification before placement on an eye. Systems and methods are described which direct a molten polymeric material into cavities corresponding to the mold sections.

19 Claims, 6 Drawing Sheets

U.S. PATENT DOCUMENTS

| | | | |
|---|---|---|---|
| 5,540,410 A | 7/1996 | Lust et al. |
| 5,545,366 A | 8/1996 | Lust et al. |
| 5,593,620 A | 1/1997 | Galas |
| 5,648,024 A | 7/1997 | Galas |
| 5,702,735 A | 12/1997 | Martin et al. |
| 5,759,318 A | 6/1998 | Galas |
| 5,804,107 A | 9/1998 | Martin et al. |
| 5,849,209 A | 12/1998 | Kindt-Larsen et al. |
| 5,849,222 A | 12/1998 | Jen et al. |
| 5,850,107 A | 12/1998 | Kindt-Larsen et al. |
| 5,861,114 A | 1/1999 | Roffman |
| 5,882,698 A | 3/1999 | Su et al. |
| 5,894,002 A | 4/1999 | Boneberger et al. |
| 5,895,192 A | 4/1999 | Parnell, Sr. et al. |
| 6,033,603 A | 3/2000 | Lesczynski et al. |
| 6,039,899 A | 3/2000 | Martin et al. |
| 6,068,464 A | 5/2000 | Su et al. |
| 6,180,032 B1 | 1/2001 | Parnell, Sr. et al. |
| 6,248,266 B1 | 6/2001 | Gartley et al. |
| 6,257,547 B1 | 7/2001 | Togo et al. |
| 6,310,116 B1 | 10/2001 | Yasuda et al. |
| 6,315,929 B1 | 11/2001 | Ishihara et al. |
| 6,405,993 B1 | 6/2002 | Morris |
| 6,431,706 B1 | 8/2002 | Dean |
| 6,444,145 B1 | 9/2002 | Clutterbuck |
| 6,475,410 B1 | 11/2002 | Nakagawa |
| 6,511,311 B1 | 1/2003 | Popps |
| 6,511,617 B1 | 1/2003 | Martin et al. |
| 6,565,776 B1 | 5/2003 | Li et al. |
| 6,592,356 B1 | 7/2003 | Lust et al. |
| 6,627,124 B1 | 9/2003 | Herbrechtsmeier et al. |
| 6,708,397 B2 | 3/2004 | Parnell, Sr. et al. |
| 6,719,929 B2 | 4/2004 | Winterton et al. |
| 6,732,993 B2 | 5/2004 | Dean |
| 6,790,873 B2 | 9/2004 | Tomono et al. |
| 6,997,428 B1 | 2/2006 | Andino et al. |
| 7,320,587 B2 | 1/2008 | Goodenough et al. |
| 2002/0020634 A1 | 2/2002 | Fortune |
| 2002/0163619 A1 | 11/2002 | Matsuzawa et al. |
| 2002/0195732 A1 | 12/2002 | Clark et al. |
| 2003/0029030 A1 | 2/2003 | Parnell, Sr. et al. |
| 2003/0062640 A1 | 4/2003 | Ansell et al. |
| 2003/0108637 A1 | 6/2003 | O'Dunlaing et al. |
| 2003/0134132 A1 | 7/2003 | Winterton et al. |
| 2003/0160343 A1 | 8/2003 | Hodgkinson |
| 2003/0164562 A1 | 9/2003 | Li et al. |
| 2003/0164563 A1 | 9/2003 | Calvin et al. |
| 2003/0197833 A1 | 10/2003 | Hiratani et al. |
| 2003/0203066 A1 | 10/2003 | Lust et al. |
| 2004/0075039 A1 | 4/2004 | Dubey et al. |
| 2004/0075182 A1 | 4/2004 | Gobron |
| 2004/0099971 A1 | 5/2004 | Su et al. |
| 2007/0035051 A1 | 2/2007 | Darnton et al. |

FOREIGN PATENT DOCUMENTS

| | | |
|---|---|---|
| EP | 1752279 | 2/2007 |
| EP | 1752281 | 2/2007 |
| GB | 2185933 A | 8/1987 |
| JP | 05337957 A | 12/1993 |
| JP | 2002-536207 A | 10/2002 |
| WO | WO 00/46016 A1 | 8/2000 |
| WO | WO 00/59713 | 10/2000 |
| WO | WO 01/17756 | 3/2001 |

OTHER PUBLICATIONS

U.S. Appl. No. 11/200,648, filed Aug. 9, 2005.
U.S. Appl. No. 11/200,644, filed Aug. 9, 2005.
U.S. Appl. No. 11/201,410, filed Aug. 9, 2005.
U.S. Appl. No. 11/200,863, filed Aug. 9, 2005.
U.S. Appl. No. 11/200,862, filed Aug. 9, 2005.
U.S. Appl. No. 11/201,409, filed Aug. 9, 2005.
USPTO Office Action dated Sep. 14, 2009 in related U.S. Appl. No. 11/921,427.
International Search Report dated Dec. 15, 2006 in related PCT Application No. PCT/US06/30685.
USPTO Office Action dated Nov. 28, 2006 in U.S. Appl. No. 11/200,848.
USPTO Office Action dated May 25, 2007 in U.S. Appl. No. 11/200,848.
USPTO Advisory Action dated Aug. 7, 2007 in U.S. Appl. No. 11/200,848.
USPTO Office Action dated Apr. 10, 2008 in U.S. Appl. No. 11/895,453.
USPTO Office Action dated Jul. 8, 2008 in U.S. Appl. No. 11/895,453.
European Search Report dated Nov. 11, 2011 in related European Application No. EP11181310.

* cited by examiner

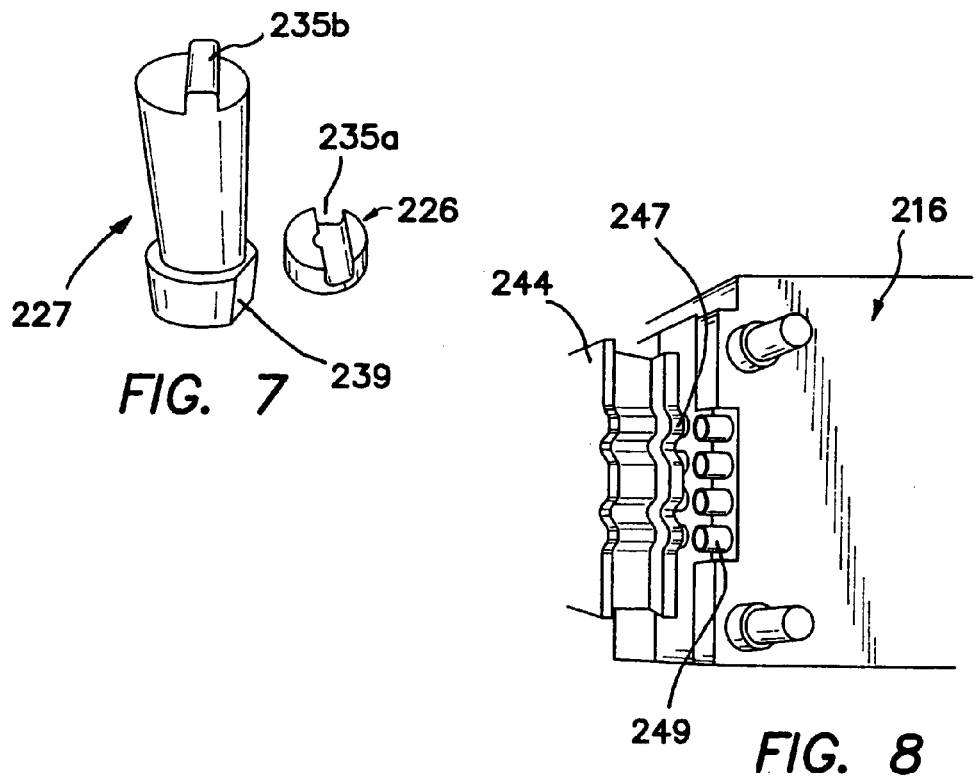
FIG. 7
FIG. 8
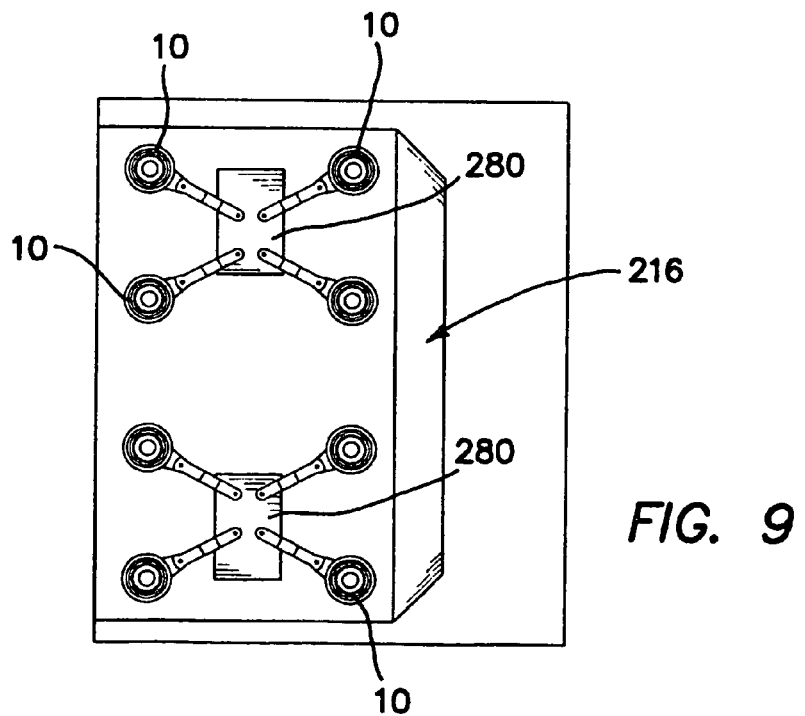
FIG. 9

CONTACT LENS MOLDS AND SYSTEMS AND METHODS FOR PRODUCING SAME

CROSS-REFERENCE TO RELATED APPLICATIONS

This application is a continuation of U.S. patent application Ser. No. 11/921,427, filed Nov. 30, 2007, which is a 371 of International Application No. PCT/US2006/030685, filed Aug. 7, 2006, which is a continuation-in-part of U.S. application Ser. No. 11/200,848, filed Aug. 9, 2005, now U.S. Pat. No. 7,320,587, the entire contents of all of which are hereby incorporated by reference.

The present invention generally relates to the manufacture of contact lenses and more specifically relates to molds used in the production of contact lenses, and systems and methods for producing contact lens molds.

BACKGROUND

One method of manufacturing ophthalmic lenses, such as intraocular lenses and contact lenses, is by cast molding. Cast molding of contact lenses is well known. See, for example, Appleton, et al., U.S. Pat. No. 5,466,147, Morris, U.S. Pat. No. 6,405,993, Dean, U.S. Pat. No. 6,431,706, and Dean, U.S. Pat. No. 6,732,993.

Typically, a mold assembly for producing a single contact lens includes a female mold section having a concave optical surface defining an anterior surface of a lens to be made, and a male mold section having a convex optical surface defining a posterior surface of the lens to be made. When individual male and female mold sections are assembled together, a contact lens shaped cavity is formed between the concave surface of the female section and the convex surface of the male section.

A contact lens precursor material, for example a curable mixture of polymerizable monomers, is placed or deposited within the lens shaped cavity, or more specifically, the lens precursor material is placed in contact with the concave surface of a first mold section and a second mold section is placed on the first mold section so that the convex surface of the second mold section contacts the lens precursor material and maintains the lens precursor material in the lens shaped cavity. The lens precursor material is cured in the mold assembly to form a contact lens. The contact lens is removed from the mold sections and is further treated and eventually packaged for consumer use.

The male and female mold sections used in the above-mentioned contact lens manufacturing process are themselves commonly formed through the use of injection molding processes. These mold sections may be made molded from thermoplastic materials, for example, such as polystyrene or polypropylene, and the like.

Martin et al., U.S. Pat. No. 6,039,899, discloses methods and apparatus for automated high speed manufacturing of contact lens blanks. The apparatus includes an injection molding station for production of contact lens mold sections used to make the blanks.

EP 1136222 A1 discloses methods for the production of contact lenses in which resin molds are formed in a die assembly, the resin molds are then filled with a contact lens molding material, and the filled resin molds are assembled to form contact lenses between the resin molds.

EP 1352736 A1 discloses a contact lens mold assembly comprising multiple, identical, stackable contact lens molds.

Larsen, U.S. Pat. No. 4,565,348, discloses another prior art approach to manufacturing lens molds. Pursuant to this approach, an array of molding surfaces carried on a polystyrene frame are used to form an array of contact lenses. One molded frame carries a 2×4 array of concave front or female mold halves, and another molded frame carries a 2×4 array of convex base or male mold halves.

Additional patents and publications disclosing methods and/or apparatus for manufacturing the molds used in lens manufacture include Lust et al., U.S. Patent Application Pub. No. US 2003/0203066 A1; Lust et al. U.S. Pat. No. 6,592,356; Lust et al., U.S. Pat. No. 5,540,410; and Parnell, Sr. et al., U.S. Pat. No. 6,180,032.

While the aforementioned methods, processes and apparatus have enhanced the speed and efficacy of contact lens manufacturing, there is still a need for even more effective, more efficient processes and systems for meeting the present high demand for contact lenses.

SUMMARY OF THE INVENTION

New contact lens molds, mold assemblies and systems and methods for manufacturing contact lens mold assemblies have been discovered. The present apparatus and systems are especially useful for facilitating high speed production of high quality contact lenses, for example but not limited to soft hydrophilic silicon-based contact lenses. More specifically, the present mold sections, mold assemblies, molding systems and methods are useful in the production of silicone-hydrogel contact lenses or contact lenses that comprise a silicone hydrogel material, including daily wear lenses and extended or continuous wear lenses (e.g., contact lenses that can be continuously worn on an eye for several days or weeks, for example, about 30 days).

The present mold assemblies comprise contact lens mold sections, each section including a lens-defining surface, that when assembled together, define a contact lens shaped cavity therebetween. The mold sections themselves can be molded using injection molding techniques. The mold assemblies are formed by placing two mold sections in contact with each other to form a contact lens shaped cavity, as discussed herein.

Advantageously, mold assemblies in accordance with the invention may comprise universal mold sections. As used herein, "universal mold section" refers to a mold section that includes both a convex lens-defining surface and a substantially opposing, concave lens-defining surface, both surfaces being effective to form an optically acceptable surface of a contact lens. Thus, each mold section can be understood to have two optically acceptable surfaces, or two surfaces that are structured to form a single contact lens with optically acceptable anterior and posterior surfaces. Two of such universal mold sections, when assembled together, define a lens shaped cavity between the convex lens defining surface of one of the mold sections (e.g., a first mold section) and the concave lens-defining surface of another mold section (e.g., a second mold section). Each of the lens-defining surfaces is an optical quality or optically acceptable surface, meaning that each lens-defining surface has a smoothness effective to impart a high quality optically smooth surface to a lens product molded therefrom.

Systems and methods for manufacturing universal mold sections having substantially opposing, optical quality surfaces are provided by the present invention.

In addition, features of the present systems and methods are provided which are directed at facilitating automated, highly reliable identification of each mold section produced by the systems and methods. The mold assemblies themselves can include an identification indicator, such as a structure for facilitating identification and/or tracking of the mold sections during production of contact lenses. These tracking features may include a generally "panhandle" shaped structure of the mold assemblies. For example, each mold section includes an elongated region extending generally radially outwardly from the lens-defining surface and including some form of indicia, preferably indicia that can be reliably read using a machine, for example, a laser scanner. Indicia can be placed on the mold sections, or the panhandle of the mold sections, during the process of manufacturing the mold sections. These and other features of the invention greatly enhance downstream lens manufacturing from the mold assemblies and quality control of the lens manufacturing process.

For example in accordance with one embodiment, the present invention provides a mold assembly for use in making a lens, for example, a contact lenses, for example, a soft, silicon-based hydrophilic contact lens. The mold assembly generally comprises a pair of mold section bodies each mold section body including an optic region having a lens-defining surface. The lens-defining surface has a surface contour that is a negative of an anterior surface of a contact lens or a negative of a posterior surface of a contact lens. Each mold section body further comprises a flange region circumscribing, for example, substantially completely circumscribing, the lens-defining surface. Additionally, the mold section body further comprises an elongated region preferably integrally molded with the flange region and extending radially outwardly therefrom. Another embodiment of the present invention relates to the individual mold sections used to form the mold assemblies.

In some embodiments, the elongated region of the mold section body has a length and geometry effective to provide a desired wall thickness of the optic region or bowl section of the mold section. For example, the elongated region may have a length of at least about 15 mm, said length being measured from the outer perimeter of the flange region where the elongated region joins the flange region, to a distal tip of the elongated region. In some embodiments, the elongated region length is between about 20 mm and about 40 mm, preferably between about 30 mm and about 35 mm. In one embodiment, the length is about 30 mm.

The elongated region may have a substantially uniform width along a major portion thereof. In a preferred embodiment, the elongated region includes a first portion having a substantially uniform width and a second portion having a width that diverges in a direction away from the first portion toward the flange region, for example at an angle of between about 10° and about 30°. The first portion may be understood to be a proximal portion, and the second portion may be understood to be a distal portion. Or, the first portion may be a proximal portion, the second portion may be an intermediate portion, and the optic region and flange may be a distal portion.

In certain embodiments, the elongated region is substantially planar and includes substantially no steps or discontinuities along the length thereof. For example, the elongated region does not include a ramp portion that has an incline surface oriented from the proximal portion towards the distal portion.

In one embodiment, the second portion is thinner than the first portion. For example, the first portion of the elongated region has a substantially uniform first thickness and the diverging second portion has a second thickness that is less than the first thickness.

In certain embodiments, the first thickness of the elongated region is between about 0.4 mm, or about 0.6 mm, or about 0.8 mm, or about 1 mm and about 1.2 mm or about 1.4 mm, or about 1.6 mm or about 2 mm. Preferably, the first thickness is between about 0.8 mm and 1.6 mm. The second thickness of the elongated region is preferably no greater than about 0.4 mm and about 1.8 mm. Preferably the second thickness is between about 0.8 mm and about 1.6 mm.

A mold assembly, in accordance with an embodiment of the invention, comprises two or more universal mold sections assembled together, for example, in a stacked fashion, and defining a lens shaped cavity between the first lens-defining surface of one of the mold sections, and the second lens-defining surface of the other mold section. It can be appreciated that numerous advantages and benefits are afforded by the universal mold sections of the present invention. For example, by using the present universal mold sections, the manufacture of lenses requires a reduced number of different mold sections, relative to conventional lens mold assemblies which typically utilize a posterior curve mold section and a different anterior curve mold section for manufacturing a lens. In addition, the present contact lens mold assemblies and systems for manufacturing such contact lens mold assemblies require a reduced number of different molding machine components, and provide enhancements in management of contact lens mold inventory, for example.

Additional information that may be helpful to understanding the concept of "universal" mold sections having opposing lens defining molding surfaces, is disclosed in Japanese Patent No. JP 05337957A, which teaches a system for molding a contact lens using stacked identical mold forms.

In another aspect of the invention, mold sections, for example, mold sections as described elsewhere herein, are provided which include one or more identifiers or indicia for identifying one or more characteristics of the mold section, for example, a characteristic of a lens to be formed using the mold section. To illustrate, and without limitation, indicia may be provided, for example in the form of a band, a color, a mark, a texture, etching or a roughened surface, and the like, and combinations thereof, useful in facilitating identification of a characteristic of a mold section related to information, for example, optical power, shape, size and/or other identifying information, about a lens to be molded using the mold section. In an especially advantageous embodiment, such indicia are provided as one or more machine readable bands located on the elongated region of one or more of the mold sections.

Using such identifying indicia, multiple mold sections can be easily and rapidly compared against one another and assembled as appropriate to form one or more mold assemblies having a desired lens-shaped cavity, and ultimately to provide the desired lens or lenses cost effectively and/or in a mass production context. For example, the mold sections may each be identifiable or "readable", for example, at least one of visually readable, tactilely readable, and/or machine readable and/or the like and/or combinations thereof. The indicia may comprise a band of an elongated region of the mold section, for example, the band or surface being a colored surface, a roughened surface, a frosted surface, a marked surface, a shaped surface (such as having a width that is different from a width of a similar band or surface on another, different mold section and the like.

In an especially advantageous embodiment of the invention, the mold sections are structured to be automatically identifiable, that is, to be identifiable using automated means. For example, the mold sections may include indicia that are readable using a laser scanning system, other automatic scanning systems, and the like, and combinations thereof.

In one aspect, the present invention comprises mold sections useful in the production of contact lenses by the polymerization of a polymerizable composition provided in the assembled mold sections. The mold sections of the invention may themselves be molded articles of thermoplastic polymer materials that are transparent or at least partially transparent to polymerizing radiation, for example, ultraviolet light.

In an embodiment of the invention, molding assemblies, each including a complementary pair of first and second mold sections, are used in the production of hydrogel lenses, hydrogel contact lenses and the like, for example, silicon-containing hydrophilic lenses, silicone hydrogel contact lenses, other hydrophilic lenses and contact lenses and the like. This is accomplished by molding a composition, for example a polymerizable composition, within a lens shaped cavity defined between two complementary mold sections. For example, the polymerizable composition may comprise one or more monomers and a solvent. The composition is placed or deposited onto a concave lens defining surface of one of the mold sections. The other mold section is placed on top of the first mold section to enclose the composition within a lens shaped region defined therebetween. The filled, assembled mold sections are coupled together, for example, using an ultrasonic horn to weld one or more contact regions located radially outwardly of the filled lens shaped cavity. The filled and welded mold assembly is then subjected to polymerizing conditions, such as an irradiation assembly with actinic, visible and/or ultraviolet radiation, to thereby produce a polymer article in the shape of a desired lens.

After the polymerization process is completed, the complementary sections of the mold assembly are separated to reveal the polymerized lens shaped article on one of the mold sections. The article is then subjected to post-polymerization steps such as removal from the mold section and extraction and hydration of the article. For example, after the polymerization is complete, extractable components in the polymer article may be displaced with solvents or water to produce a hydrated lens, for example, having a size and shape suitable for placement on an eye of an individual.

In another aspect of the invention, manufacturing systems are provided which are useful for manufacturing mold sections having optical quality surfaces or contact lens mold sections. The systems are particularly useful in manufacturing mold sections that are subsequently used to mold ophthalmic lenses, for example, contact lenses.

In general, the manufacturing systems comprise an injection molding assembly, and a molding component couplable to the injection molding assembly. The molding component is sometimes referred to as a molding tool, and generally has one or more, preferably four or more, cavities, for example, mold section shaped cavities. The injection molding assembly is couplable to a supply of molding material, for example, thermoplastic material. The injection molding assembly is effective to inject, for example, under pressure, the thermoplastic material, in a fluid state, into the mold section shaped cavities. The thermoplastic material is allowed to cool in the cavities, the molding component is opened, and the cooled and solidified mold sections are removed therefrom.

In an embodiment of the invention, the mold section shaped cavity includes an optic cavity portion having a lens shaped surface and an elongated cavity portion. Contact lens mold sections are made by introducing an amount of the fluid thermoplastic material using the injection molding assembly into the elongated cavity portion through an inlet. The system is structured so that the flow characteristics of the fluid thermoplastic polymeric material, upon reaching the optic portion of the mold cavity, are sufficiently flowable or fluid to provide optical quality surfaces on the final mold section.

For example, the elongated cavity portion advantageously includes structure, for example, a fan shaped cavity portion that allows the flow of thermoplastic material to spread outward toward the flange region with a smooth, laminar flow of the material. This shape helps reduce stress concentrations adjacent the optic cavity portion by spreading the opening to the optic cavity portion over a wide area. Advantageously, a desired flow rate can be obtained without providing a step, ramp, or sloped surface along the elongated cavity portion.

Preferably, the present invention provides a system for producing contact lens mold sections in which the flow characteristics of the fluid thermoplastic polymeric material used to form the mold sections advantageously have an appropriate balance of high fluidity during introduction of the fluid thermoplastic polymeric material into the mold cavity and rapid cooling and/or solidification of the thermoplastic material once the cavity has been filled.

The elongated cavity portion is dimensioned and the inlet is positioned to be effective to provide the resulting substantially solid mold section article with an optical quality surface or surfaces at the optical cavity portion, and effectively reduced time to solidify the thermoplastic polymeric material relative to a molding apparatus defining a substantially identical mold cavity without the elongated portion. In one embodiment, the elongated cavity portion has a length to depth ratio in a range of about 10:1, or about 15:1, or about 22:1 to about 30:1 or about 44:1 or about 50:1. Preferably, the elongated cavity portion has a length to depth ratio of between about 22:1 to about 44:1.

The thermoplastic material may be a thermoplastic polymeric material, for example, selected from any suitable such material or mixtures of such materials. For example, and without limitation, the thermoplastic polymeric material may comprise a polymer such as polyolefins, e.g., polypropylene, polyethylene, and the like, poly ethylene vinyl alcohol (EVOH), polyamides, poly oxy methylene, poly ethylene terephthalate, cyclic olefin co-polymers, polystyrene, polyvinyl chloride, copolymers of styrene with acrylonitrile and/or butadiene, acrylates, for example, poly methyl methacrylate, and the like, polyacrylonitrile, polycarbonate, polyesters, poly(4-methylpentene-1), and the like and mixtures thereof. Poly ethylene vinyl alcohol (EVOH) is a preferred material for forming contact lens mold sections using the systems of the invention.

In yet another aspect of the invention, a system for manufacturing a variety of different lens mold sections is provided. The system generally comprises an injection molding assembly connectable to a source of molding material and a change plate assembly structured to be removably coupled to the injection molding assembly. The change plate assembly includes a first plate and a second plate that when assembled together, define one or more cavities shaped as mold sections that are useful in the production of contact lenses. In one embodiment, the first plate includes at least one first molding surface, which defines, for example, an anterior surface of a contact lens. The second plate includes at least one second molding surface which may define, for example, a posterior surface of a contact lens.

In certain embodiments, each of the first plate and the second plate includes a plurality of first molding surfaces and a plurality of second molding surfaces, respectively. Thus, the first and second plates when assembled with one another form a plurality of mold section-shaped cavities. In some embodiments, the first plate includes a plurality of different first molding surfaces, for example a plurality of convex molding surfaces that have different optic curves. In one embodiment, the molding assembly comprises cavities to form eight substantially identical mold sections in a single molding cycle.

Each of the first molding surfaces can be provided by an insert that is removably coupled to the first plate. Alternatively, each of the first molding surfaces can be machined into a face of the first plate and integral therewith. Likewise, each of the second molding surfaces can be provided by an insert that is removably coupled to the second plate, or can be a surface that is machined into a face of the second change plate and integral therewith. Using inserts may provide advantages such as increased efficiency in changing the properties of the mold sections, such as the shape and dimensions of the optical surfaces of the mold sections.

In one embodiment of the invention, a change plate assembly is useful for molding contact lens mold sections having both first and second substantially opposing lens defining surfaces. For example, a set of first inserts includes surfaces corresponding to a front curve of a contact lens and a set of second inserts includes surfaces corresponding to a back curve of a contact lens. The first and second lens-shaped surfaces of the mold sections are preferably formed using first molding inserts and second molding inserts, respectively, located within the first change plate and the second change plate, respectively. Advantageously, each of the first and second inserts is removably positioned within a bushing, which is, in turn, fitted within the change plate assembly.

In some embodiments of the invention, at least one of the first inserts and the second inserts are single-piece elements, or single-piece optics, having datum surfaces machined into the insert and corresponding to a lens edge. A specialist optical precision lathe can be used to perform this machining, so no subsequent polishing is required. Preferably, both the first and second inserts includes datum surfaces that provide or are effective in forming a rounded lens edge on a contact lens. Some molding tools and inserts that are useful in the production of rounded edge contact lenses, and the advantages thereof are described in Dean, U.S. Pat. No. 6,431,706.

Preferably, the inserts used to produce the optically replicated surfaces on the mold sections are made from copper nickel alloys, aluminum alloys, pure nickel coated substrates, ferrous alloys, engineering ceramics, engineering plastics or the like.

A cooling assembly can also be provided in the present systems. The cooling assembly can comprise a first cooling circuit located within the system so as to be effective to pass cooling fluid through the injection molding assembly, and a second cooling circuit that is independent of the first cooling circuit and is effective to pass cooling fluid through the change plate assembly. In this embodiment of the invention, the change plate assembly can be physically removed from the molding system while the first cooling system remains in operation to maintain cooling of the other components of the system. For example, the first cooling circuit includes a plurality of inlets located on the change plate assembly and is connectable to a source of cooling fluid. The first cooling circuit may include a feature for facilitating coupling and decoupling of the change plate assembly with the injection molding assembly, for example the cooling circuit may include a manifold coupler, or "multicoupler" for facilitating coupling of the plurality of inlets to the source of cooling fluid.

In another aspect of the invention, the change plate assembly includes generally conical locator parts for facilitating positioning of the change plate assembly in the injection molding assembly.

In yet another aspect of the invention, the system further comprises a vacuum assembly for removing gasses from the system during a molding process wherein the vacuum assembly is advantageously structured to become operable by default when the change plate assembly is coupled to the injection molding assembly. The vacuum assembly is effective to apply continuous vacuum to the system during a molding process. The vacuum assembly may comprise a channel located between the change plate assembly and the injection molding assembly, the channel being connected to a vacuum source. The vacuum assembly is designed to remove off-gasses that might otherwise accumulate within the system.

In some embodiments of the invention, the system comprises a temperature sensor effective to measure temperature of the change plate assembly. For example, the temperature sensor may include one or more surface monitoring thermocouples located at strategic locations on or within housing plates of the injection molding assembly. Like the vacuum assembly, the temperature sensor is structured to become operable by default upon coupling of the change plate assembly to the injection molding assembly.

Removal and subsequent use of the molded article formed between first and second inserts is greatly facilitated by positioning the convex insert, or back curve insert, on a moving portion of the injection molding tool. This facilitates more efficient processing, for example, automated processing, of lenses using the mold sections.

In normal operation, the molded article, or contact lens mold section, may adhere to the convex insert, or front curve insert. In order to cause the molded article to instead be retained on the back curve insert, the present systems may comprise retaining structure or mechanisms. For example, in accordance with one embodiment of the invention, the bushing containing the back curve insert may include a surface having one or more cut-out portions, for example, notches or grooves for capturing some of the thermoplastic material during the molding process. The cut out-portion or portions have a configuration and location effective to facilitate retaining the molded article on the back curve insert. In one embodiment, a substantially V-shaped groove is provided, the groove having a depth of between about 0.025 mm and about 0.5 mm, more preferably, between about 0.05 mm and about 0.20 mm. For example, a V-shaped groove is provided having a depth of about 0.075 mm. The groove preferably has an incline angle of between about 20° or about 30° and about 70° or about 80°. In a preferred embodiment, the incline angle of the groove is between about 30° and about 60°, for example, is about 45°.

Without wishing to limit the invention to any particular theory of operation, it is believed that when molten material within the cavity solidifies within the groove, the molded article tends to be retained thereby and therefore remain adhered to the second insert when the molding machine, or molding component, is opened.

Alternatively or additionally, a raised structure, for example, a raised portion, for example, a ridge, protrusion or the like, on the bushing of second insert, may be employed to be effective to cause the molded article to be retained by the second insert. The raised structure may be located on, for example projecting from, the bushing which contains the second insert. In one embodiment, the raised projection has a height of about 0.05 mm to about 0.5 mm, for example about 0.2 mm, and a width of about 0.1 mm to about 1.0 mm, for example, about 0.6 mm, with undercuts of between about 13° and about 45°, for example about 30°. The raised structure is effective in forming a groove or notch in the mold section. For example, a notch or groove may be formed in the flange portion of the mold section. In certain embodiments, the insert is provided with a plurality of non-continuous raised structures to form a plurality of separate notches or grooves in the flange portion of the mold section. For example, the rear surface of a flange region of a mold section (e.g., the surface of the flange adjacent the convex surface of the mold section) may comprise three notches located around the convex surface. The three notches can be approximately 120 degrees apart from each other and do not contact each other. The notches are effective in securing the mold section to a surface of the plate in contact with the rear surface of the mold section. Thus, a mold section with a plurality of notches, as described above, can be understood to comprise a non-continuous ring around the optic portion of the mold section.

Both grooved or recessed structures and raised structures on the bushing may be intermittent or spaced apart, rather than continuously circumscribing the insert, as described above.

Many different mechanisms may be employed to achieve the same means of retaining the molded article on the second insert.

Preferably, the molding surfaces that are components of the injection molding machine are maintained at a desired temperature by inclusion of a cooling system, for example a cooling circuit, which is advantageously employed throughout the injection molding system.

For example, each of the first and second inserts preferably has a circumferential cooling passageway defined therearound in which fluid coolant is circulated. In one embodiment, the cooling passageways are defined in the bushings retaining the inserts. In accordance with some embodiments, the inserts themselves include no, or are substantially free of, fluid circulation passageways defined therein.

In addition to the foregoing, it can be appreciated that another aspect of the present invention relates to the use of the present mold sections in the manufacture of contact lenses, such as silicone hydrogel contact lenses.

An additional aspect of the invention relates to methods of producing the contact lens mold sections. Such methods include a step of directing a molten thermoplastic material into a mold cavity, as described herein.

Yet another aspect of the present invention relates to methods of using the mold sections to produce contact lenses. For example, an embodiment relates to a method of producing a plurality of contact lenses having different prescriptions, using the universal mold sections, as described herein.

Each and every feature described herein, and each and every combination of two or more of such features, is included within the scope of the present invention provided that the features included in such a combination are not mutually inconsistent. In addition, any feature or combination of features may be specifically excluded from any embodiment of the present invention.

These and other aspects of the present invention are apparent in the following detailed description and claims, particularly when considered in conjunction with the accompanying drawings in which like parts bear like reference numerals.

BRIEF DESCRIPTION OF THE DRAWINGS

FIG. 7 is a perspective view of a tooling of the molding system shown in FIG. 6, namely an insert body and an insert having an optical surface, the tooling including features for preventing rotational mis-orientation of the optical surface.

FIG. 8 is a perspective view of a portion of a change plate assembly of the molding system, showing a multicoupling feature for facilitating connection and disconnection of a water cooling line.

FIG. 9 is a top view of a face of one of the change plates with eight newly formed mold sections disposed thereon, showing two sets of four mold sections with each set of four mold sections having been formed with one valve gate cluster.

DETAILED DESCRIPTION

Figure 1:
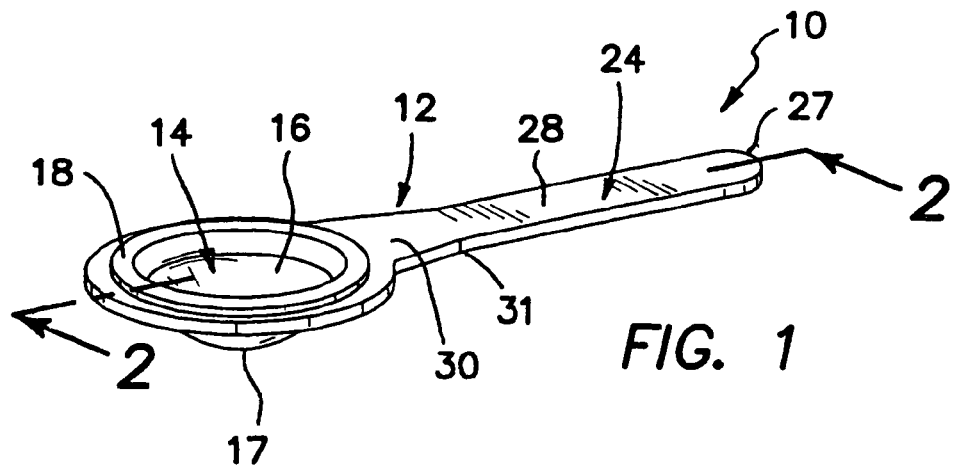
FIG. 1 is a perspective view of a mold section showing a concave molding surface that is a negative of a front curve of a contact lens.
Figure 2:
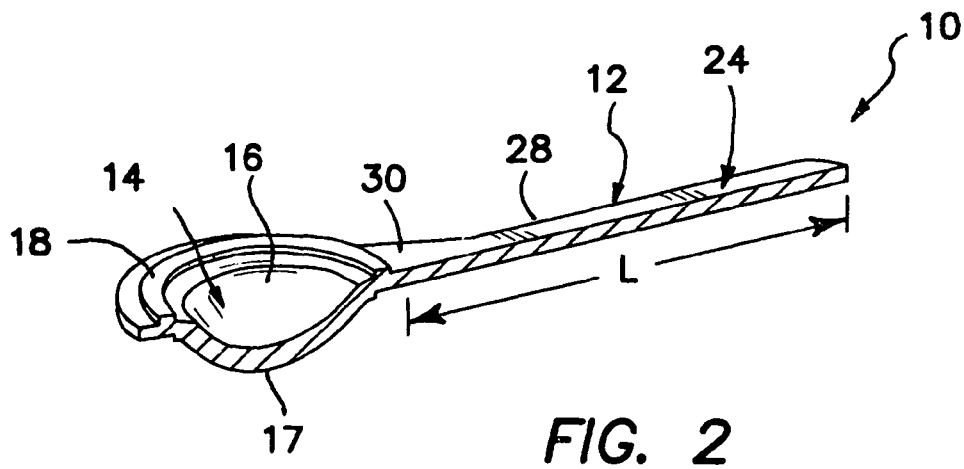
FIG. 2 is a cross-sectional view of the mold section taken along line 2-2 of FIG. 1.

Turning now to FIGS. 1 and 2, a mold section of the present invention for use in making a contact lens is shown generally at 10. The mold section 10 generally comprises a mold section body 12 that includes an optic region 14 having a first lens-defining surface 16 which is illustrated as a negative of an anterior surface of a contact lens. The body 12 further includes a flange region 18 at least partially circumscribing the optic region 14, and a substantially non-triangular elongated region 24 extending away from the optic region 14 and aligned substantially parallel with the flange region 18. The mold sections, systems, and methods disclosed herein can be used in the formation of toric, aspherical, bi-focal, multi-focal, and colored contact lenses. The lenses can be made of non-silicone hydrogel materials or silicone hydrogel materials. In preferred embodiments, the contact lenses are silicone hydrogel contact lenses.

The mold section preferably comprises poly ethylene vinyl alcohol (EVOH). For example, embodiments of the present mold sections, including the illustrated embodiments, can be made from an EVOH based resin publicly available under the tradename of SOARLITE™ S by Nippon Gohsei, Ltd. (Japan). Other suitable molding materials include polypropylene, polyethylene, polyamides, poly oxy methylene, poly ethylene terephthalate, cyclic olefin co-polymers, polystyrene, polyvinyl chloride, copolymers of styrene with acrylonitrile and/or butadiene, acrylates such as poly methyl methacrylate, polyacrylonitrile, polycarbonate, polyamides, polyesters, poly(4-methylpentene-1), and the like, and mixtures thereof.

The mold section 10 may be structured to be used as a universal mold section, as described elsewhere herein, in that the mold section includes both male and female molding surfaces that are optically acceptable. More specifically, in the embodiment shown, the optic region 14 of the mold section includes first lens defining surface 16 and a substantially opposing second lens defining surface 17. In this case, the first lens-defining surface 16 is a negative of an anterior curve (front curve) of a contact lens and the second lens defining surface 17 is a negative of a posterior curve (back curve) of a contact lens. It can be appreciated therefore that the mold section 10 in accordance with this embodiment of the invention includes both a concave molding surface 16 for forming the front curve of a lens, and a convex molding surface 17 for forming a back curve of a lens, on a single mold section 10. Both surfaces are sufficiently smooth to produce a contact lens, such as a silicone-hydrogel contact lens, having two optically acceptable surfaces without requiring additional surface modifications or treatments to make the lenses ophthalmically acceptable.

Figure 3:
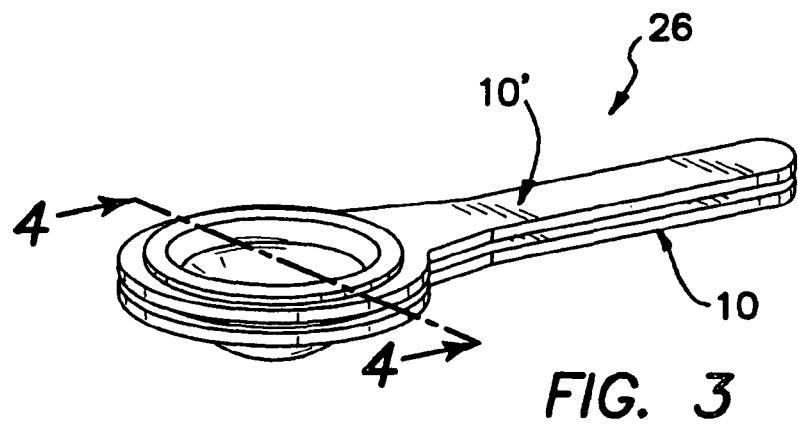
FIG. 3 is a perspective view of a molding assembly, including two mold sections stacked one on the other.

A mold assembly 26 in accordance with a related aspect of the invention is shown in FIG. 3. The mold assembly 26 comprises mold section 10, hereinafter usually referred to as "first mold section 10" and similar or substantially identical second mold section 10'.

Figure 4:
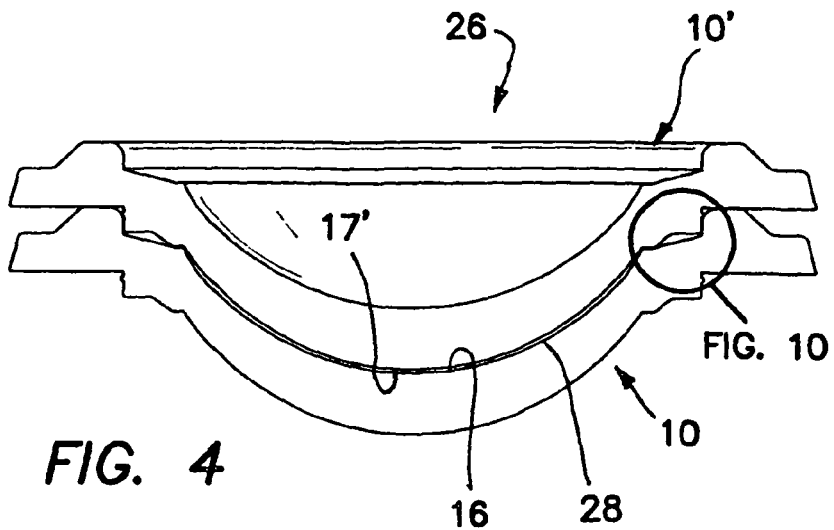
FIG. 4 is a cross-sectional view of the mold assembly taken along line 4-4 of FIG. 3, the mold assembly defining a lens shaped cavity.

As shown more clearly in FIG. 4, the mold assembly 26 is used in the manufacture of a single lens, for example a single contact lens, that is formed between a first lens defining surface 16 of first mold sections 10 and a second lens defining surface 17' of the second mold section 10'. Each of surfaces 16 and 17' are high optical quality surfaces having few or no imperfections that would be transferred to a lens molded with such mold sections.

The term "optical quality" as used herein to describe the lens-defining surfaces of the resulting mold sections is intended to mean that the surface is sufficiently smooth such that when a polymerizable monomeric composition is polymerized, while in contact with that surface, into a product having the shape and (upon hydration, if necessary) dimensions, refractive properties and water content of a ready-to-wear contact lens which can be said as a whole to be "optical quality." An optical quality lens has a degree of surface smoothness and contour precision and is sufficiently free of internal defects to provide the desired refractive correction without distortion, and/or without substantial discomfort to the lens wearer. Known analytical techniques, such as interferometry, can be employed to confirm the smoothness and contour precision of the surfaces.

Referring back to FIG. 2, the elongated region 24 of the mold section 10 has a length L extending between a tip or proximal end region 27 of the elongated region and the junction of the elongated region with the flange region 18. The length L is at least as great as a diameter of the lens-defining surface 16. The length L of the elongated region 24 is between about 20 mm and about 40 mm, more preferably between about 30 mm and about 35 mm. In the illustrated embodiment, the length L is about 30 mm.

The elongated region 24 includes a first portion 28 of substantially uniform width and a second portion 30 having a distally increasing or distally diverging width so that at a junction of the second portion with the flange region 18, the second portion 30 is substantially equivalent in width to the flange region 18.

In a preferred embodiment, the first portion 28 of the elongated region 24 has a uniform width between substantially parallel, opposing peripheral longitudinal edges thereof, of between about 5 mm and about 15 mm. The second portion 30 has opposing peripheral edges which diverge at an angle of between about 10 degrees and about 20 degrees measured from the substantially parallel peripheral edges of the first portion 28.

The first portion 28 has a substantially uniform thickness of between about 0.5 mm and about 2.0 mm, preferably between about 0.8 mm and about 1.6 mm. In a preferred embodiment, the first portion 28 has a somewhat greater thickness than a thickness of the second portion 30. The thickness of the optical region, such as the thickness of the bowl region of the mold section or the thickness between the concave surface and convex surface of the mold section can be from about 1.5 mm to about 1.7 mm. In one embodiment, the thickness is about 1.6 mm.

In accordance with an especially advantageous embodiment of the invention, the ratio of the length L of elongated region 24 to an average thickness of elongated region 24 is a ratio between about 22:1 and about 44:1.

Figure 5:
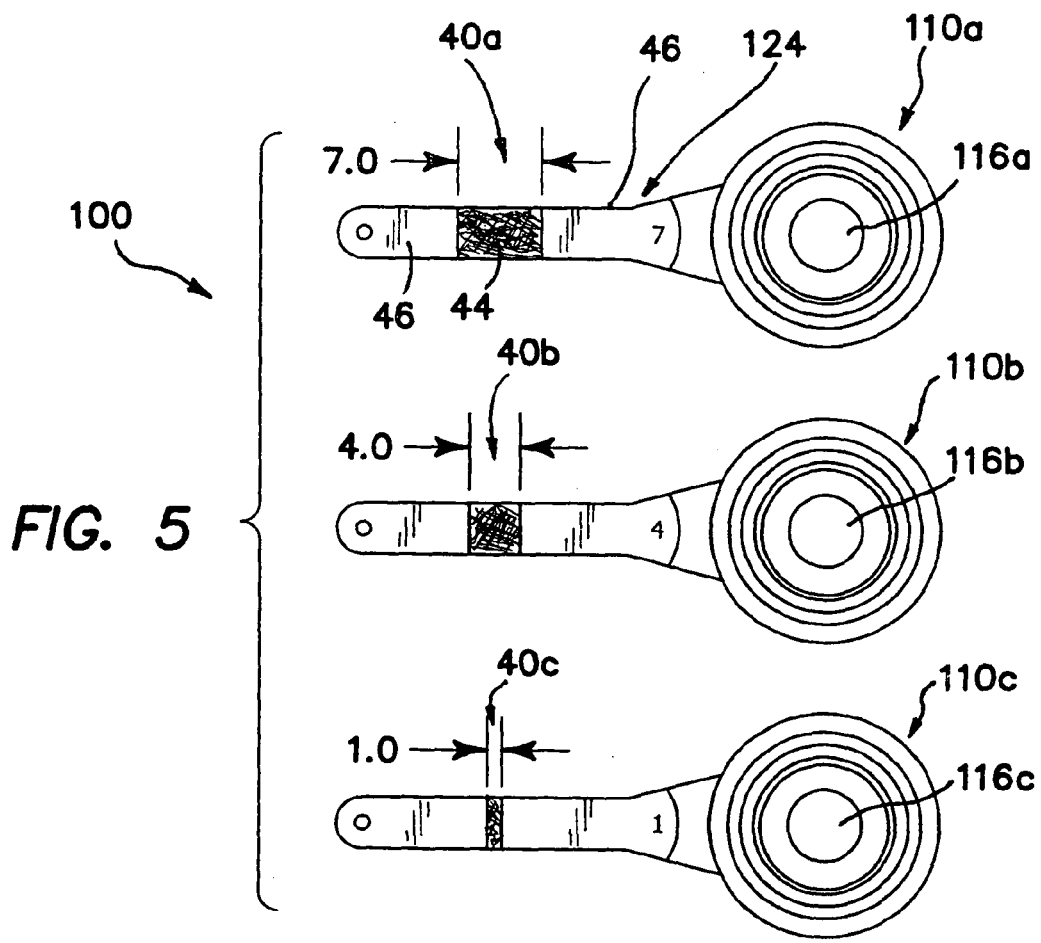
FIG. 5 shows a set of mold sections in accordance with an embodiment of the invention, each mold section including indicia for facilitating distinguishing and/or identifying of a characteristic of the mold section.

Turning to FIG. 5, the present invention provides an assembly 100 useful for molding contact lenses wherein the assembly 100 comprises a plurality of mold sections, represented by mold sections 110a, 110b and 110c. In this embodiment, each mold section 110a, 110b and 110c includes indicia 40a, 40b, 40c, respectively, effective for at least one of identifying and distinguishing a characteristic of the lens-defining surface of the mold section, for example, a distinguishing characteristic of the mold section relative to the lens-defining surfaces of the other mold sections. For example, mold section 110a includes indicia 40a which is visually distinguishable from indicia 40b of mold section 110b as indicia 40c of mold section 110c. For example, indicia 40a is effective for identifying a radius, or optical curve of the lens-defining surface 116a of mold section 110a. Likewise, indicia 40b is effective for identifying a different radius or optical curve of the lens defining surface 116b of mold section 110b. Similarly, indicia 40c is effective for identifying a radius or optical curve of the lens defining surface 116c of mold section 110c. Generally speaking, indicia 40a, 40b, 40c may be used to facilitate identification of the particular molding machine or molding tools used to make the mold section 110.

For the sake of simplicity, the following discussion will refer specifically to mold section 110a, though it is to be appreciated that the discussion further applies to mold section 110b and 110c. Indicia 40a generally comprises a first surface portion 44 along the elongated region 124 that is roughened, frosted, color-coded, etched, textured, etc., relative to an adjacent second surface portion 46 of the elongated region 124. In a preferred embodiment of the invention, indicia 40a comprises a first surface portion 44 which is defined by a roughened and/or unpolished stripe or band and adjacent second surface portions 46 are defined by relatively smooth, polished surfaces. The indicia 40a may be formed on the mold section 110a during the molding process by etching corresponding surfaces of the tool in which the mold is formed.

Advantageously, in this embodiment, indicia 40a is machine readable and therefore useful for facilitating automated processing of lenses or lens mold sections. More specifically, mold section 110a can be identified as a mold section for forming a lens having a particular front curve, back curve, or a combination thereof.

Preferably, indicia 40a is machine-readable using a laser scanning device. For example, in a particular embodiment, indicia 40a is "read" by suitable apparatus utilizing light sensors in conjunction with a laser beam scanner. When a laser beam passes along the elongated region 124, the beam will be reflected back and detected by a sensor as the beam traverses the polished surface portion 46. As the beam traverses the roughened or unpolished surface portion 44 the beam will be scattered, rendering "no echo" or "no return signal" to the sensor. Thus, it can be appreciated that by providing mold sections having one or more roughened surface portions of predetermined widths and one or more polished surface portions, or roughened surface portions having distinct locations on the elongated region, the mold sections can be identified and/or distinguished from each other. Advantageously, the indicia 40 can be formed on the mold section during molding of the mold section by utilizing etched and polished molding surfaces for forming the mold section. Other than being used to identify an ocular surface characteristic of the mold, indicia may be used as a means for identifying the origin of the mold section, the material of which the mold section is made, and/or other characteristics of the mold section that may be used to facilitate automated lens processing and/or reduce occurrence of error during lens processing.

It is to be appreciated that conventional injection molding machines, such as those known to a person of ordinary skill in the art, can be used to produce the mold sections in accordance with the invention. Molding apparatus and aspects and features thereof described in U.S. Pat. No. 5,545,366, and U.S. Pat. No. 5,451,155, may be useful in producing the mold sections of the present invention.

Figure 6:
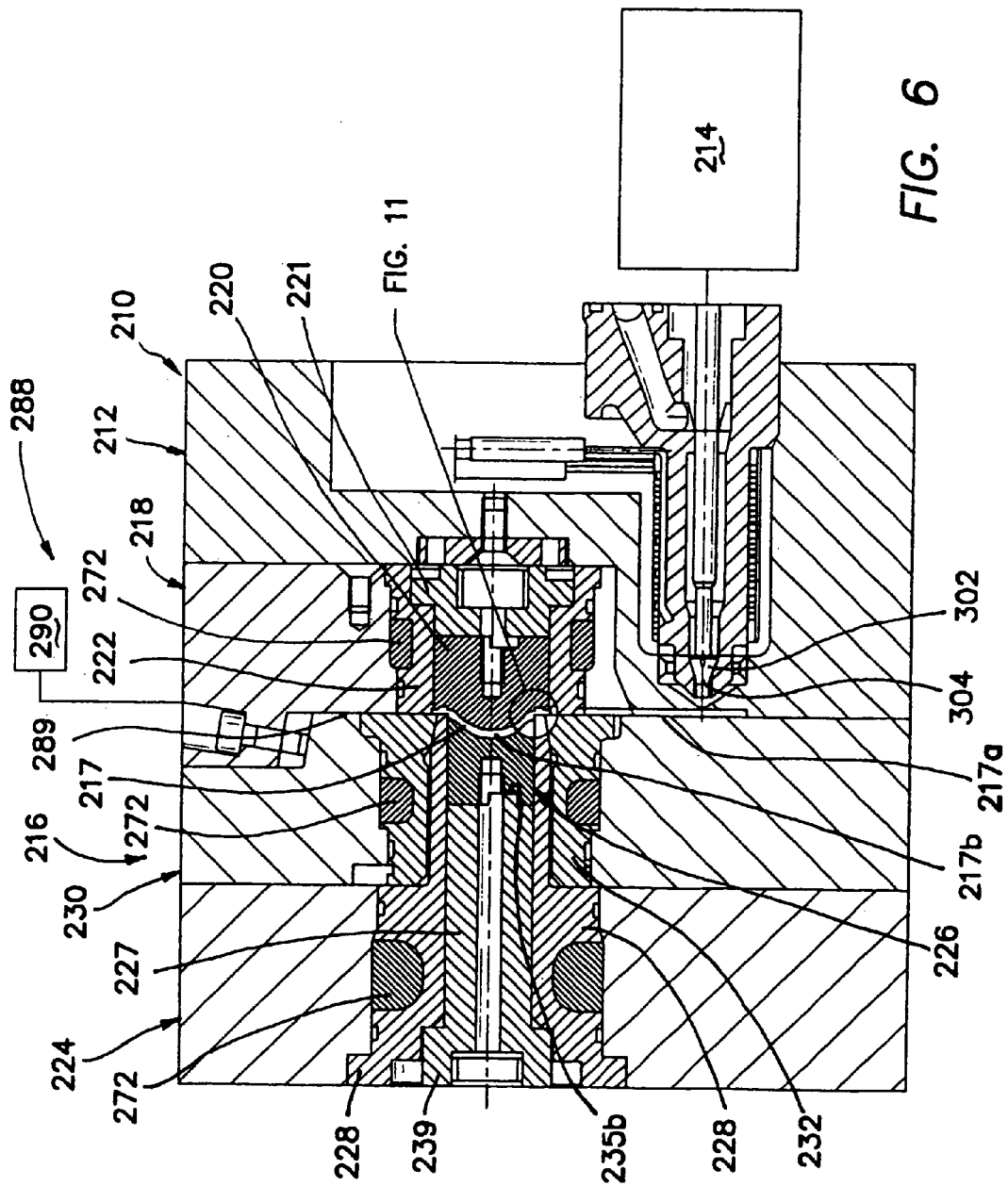
FIG. 6 is a cross-sectional view of a molding system in accordance with the present invention.

As shown in FIG. 6, an improved injection molding system in accordance with another aspect of the invention is shown in cross-sectional view generally at 210. The system 210 generally comprises an injection molding assembly 212 connectable to a source of molding material 214. Plastic pellets of molding material are contained in a hopper (not shown) from which they are dispensed into a heater of the injection molding assembly. In this specific embodiment, the molding material is EVOH which is melted by the heater to a temperature of about 255° C. However, the temperature can vary, and useful temperatures can be between about 255° C. to about 285° C.

The system further comprises a change plate assembly 216 structured to be removably coupled to the injection molding assembly 214.

In an advantageous embodiment, the change plate assembly 216 can be quickly removed, as a unitary, intact assembly, from the overall molding system 210. The structure of the change plate assembly 216, as will be described in greater detail hereinafter, enables fast set up of the system 210 with the desired optical tooling. For example, two change plate assemblies may be employed in which one change plate assembly is connected to the injection molding assembly 212 and another change plate assembly is "off-line" and loaded with a different set of optical tooling. Typically, exchange and connection of one change plate assembly for another off-line change plate assembly will take less than about 20 minutes.

In one aspect of the invention, faces of the change plates have titanium nitride surfaces that impart a high quality finish to the change plate assembly and molding surfaces that make up portions thereof. The titanium nitride faces may be hardened, for example, to about 56 Rc.

The change plate assembly 216 contains the molding tools for forming the lens-defining surfaces 16 and 17 of the mold section 10 (see FIG. 1) formed in a mold section shaped cavity 217. The elongated region 24 of the mold section 10 is formed by a hot runner channel 217a that feeds a liquid molding material, such as molten EVOH, to an optical region 217b of the mold section shaped cavity 217. Preferably, the molding surface which defines the runner channel 217a, has a discrete polished surface (high polish about 6 μm Ra) and discrete roughened surface (about 2.20 μm Ra) to form indicia on the elongated region of the mold section, for example, as described elsewhere herein and shown in FIG. 5. The length of the roughening is preferably between about 1 mm to about 8 mm.

In one embodiment, the change plate assembly 216 includes first and second plates defining a plurality of mold section shaped cavities therebetween. For example, the first plate includes at least one first molding surface, which defines for example an anterior surface of a contact lens and the second plate includes at least one second molding surface which may define, for example, a posterior surface of a contact lens in order to form the "universal" mold section shown in FIG. 1.

In a preferred embodiment, each of the first plate and the second plate includes a plurality of first molding surfaces and a plurality of second molding surfaces, respectively. Thus, the first and second plates when assembled with one another form a plurality of mold section-shaped cavities. In some embodiments, the first plate includes a plurality of different first molding surfaces, for example a plurality of convex molding surfaces that have different optic curves.

Preferably, each of the first molding surfaces is provided by an insert that is removably coupled to the first plate. Alternatively, each of the first molding surfaces is machined into a face of the first plate and integral therewith. Likewise, each of the second molding surfaces is provided by an insert that is removably coupled to the second plate, or is a surface that is machined into a face of the first change plate and integral therewith.

For example, referring to FIG. 6, in the preferred embodiment, the change plate assembly 216 includes a first plate 218, hereinafter sometimes "cavity plate," structured to hold multiple front curve molding inserts 220 mounted on front curve insert bodies 221 and loaded within a cavity bushing 222 (only one front curve molding insert 220 and insert body 221 being shown in FIG. 6). The first plate 218 may also be referred to as a female plate. The first plate 218 is located closer to the injection molding apparatus compared to a second plate 224 of the change plate assembly 216. The second plate 224, hereinafter sometimes "core plate," is structured to hold multiple back curve molding inserts 226 mounted on insert bodies 227 and loaded within a core bushing 228 (only one back curve molding insert 226 and insert body 227 being shown in FIG. 6.) In this embodiment, the change plate assembly 216 further includes a third plate 230, or a "stripper plate" having a stripper bushing 232 disposed around a portion of the core bushing 228 as shown. The stripper plate 230 facilitates ejection of finished mold sections from the mold tool. The combination of the stripper plate and the inserts may be referred to as a male plate. The stripper plate 230 moves relative to the inserts and thus can be used to release the mold sections from the inserts, as discussed herein.

The back curve insert 226 is shown in FIG. 6 as it is loaded on a distal end of the generally cylindrical insert body 227. The insert body 227 may include a location feature that prevents misorientation of the insert body 227 with respect to the bushing 228 which holds the insert body 227 in place. Such location features are desirable in order to ensure that the insert 226, and the molding surface thereof, will be properly aligned in the change plate assembly 216. This is particularly useful in the molding of toric lens mold sections where the insert may incorporate a non-rotationally symmetrical form on its optical surface.

For example, the insert body 227 may be generally cylindrical with the exception of a flattened region along one longitudinal side of the body 227. Thus, the body 227 may have a generally D-shaped cross-section. Correspondingly, core bushing 228 defines a cavity having a corresponding D-shaped cross-section in which the body 227 and first insert 226 are loaded. Other configurations are also contemplated and are considered within the scope of the invention.

Preferably, the back curve insert 226 also includes features for preventing misalignment or misorientation of the lens-shaped surface with respect to the insert body 227. For example, as shown in FIG. 7, the back curve insert 226 and insert body 227 (now being shown as removed from system 210) may include offset groove 235$a$ and corresponding offset protrusion 235$b$ for ensuring that the insert 226 can only be positioned on the insert body 227 in one position. This is particularly useful in molding toric lens mold sections in which the insert may incorporate a non-rotationally symmetric form on the optical surface thereof. Additionally, the insert body 227 may also include a feature, for example in the form of a D-shaped flange 239 corresponding to a D-shaped opening in the core bushing 228, for facilitating correct rotational orientation.

Various other alignment features may be provided on one or more components of the molding system 210 without departing from the scope and spirit of the present invention. For example, in another aspect of the invention, the change plate assembly includes structure for facilitating proper positioning of the three change plates with respect to each other. For example, in one embodiment of the invention, the change plate assembly includes generally conical locator parts, useful for ensuring proper alignment and connections of the plates.

In another aspect of the invention, the system 210 includes a cooling system for maintaining the polymeric material being deposited into the mold section shaped cavity 217 at an effective temperature for maintaining the desired flow characteristics of the material.

In a preferred embodiment, the cooling system comprises a first cooling circuit located so as to be effective to pass cooling fluid, for example water, through channels or passageways within the injection molding assembly 212, and a second cooling circuit which is effective to pass cooling fluid through channels or passageways within the change plate assembly 216. Preferably, the first cooling circuit 272 is independent of the second cooling circuit 276 such that when the change plate assembly 216 is being exchanged for a different change plate assembly, the injection molding assembly 212 can continue to be cooled.

For example, the cooling system may comprise channels 272 defined in the core bushing 228, stripper bushing 232 and cavity bushing 222 as shown in FIG. 6. A separate, independent cooling system is preferably provided for cooling the injection molding assembly 212. It is noted that in the embodiment shown, the inserts 220, 226 and insert bodies 221, 227 themselves include no fluid circulation passageways defined therein.

Effective and efficient disconnection and reconnection of water to and from the change plates 218, 224, and 230 during removal and insertion of the change plate assembly 216 is important to minimize downtime, prevent water loss and prevent mix-up of common looking connections. To facilitate low downtime, low water loss and mistake-proof connection, a series of manifold couplings, or "multicoupling" water connections are preferably employed. One such multicoupling is shown at 244 in FIG. 8.

For example, multicoupler 244 includes valved male connectors 247. The change plate assembly 216, for example the core plate of the change plate assembly, includes corresponding valved female connectors 249 in communication with the cooling circuits (not shown in FIG. 8) within the core plate. All of the male connectors 247 and female connectors 249 are preferably self-sealing valved couplers. The female connectors 249 are preferably sunk into the surface of the change plates in order to prevent damage thereto upon plate removal.

All water connectors are preferably located in an easily accessible area, for example, on an operator side of the system 210, to enable quick connection/disconnection with minimum operator movement and/or operator effort.

Because there are three change plates 218, 224, and 230, three such multicouplings are used. To prevent misconnection, the multicouplings are labeled and/or have different pitches between their connections to prevent engagement to the wrong plate. The multicouplings can, however, be inverted in the correct plate, but this is not problematic due to the symmetrical design of inlet and outlet connections between the plate and multicoupling which allows inversion without compromising effectiveness of tool cooling. The change plate assembly 216 is cooled in a separate circuit to the hot runner system of the injection molding assembly 212. Advantageously, when the change plate assembly 216 is removed, the remainder of the system 210 can continue to be cooled, thereby preventing overheating.

Turning now to FIG. 9, in a preferred embodiment, the system 210 is a multiple cavity molding system, for example but not limited to an eight-cavity molding system. FIG. 9 shows a simplified diagram of an arrangement of molded mold sections 10 disposed on a face of the stripper plate 230. Two sets of four mold sections 10 are formed by two valve gate clusters 280 connectable to four valve gate pins (not shown in FIG. 9). In this embodiment, four pins are operated simultaneously by one pneumatic actuator by use of a coupling plate. Hence four cavities are filled individually but simultaneously. The valve gate clusters may be scaled up to 12, 16, 24, etc. cavity tools within the scope of the invention by simply adding to the injection molding system 210 in a modular fashion.

Additional detail regarding this feature of the present invention will be known to those of skill in the injection molding art, and thus will not be disclosed in great detail herein.

In yet another aspect of the invention, the system 210 may further comprise a vacuum assembly 288 for removing gasses from the system during a molding process wherein the vacuum assembly is advantageously structured to become operable by default when the change plate assembly 216 is coupled to the injection molding assembly 212. The vacuum assembly 288 is effective to apply continuous vacuum to the system 210 during a molding process. The vacuum assembly 288 may comprise a channel 289 located between the change plate assembly 216 and the injection molding assembly 212, the channel 289 being connected to a vacuum source 290. In a specific embodiment, the channel is a substantially U-shaped channel that is cut into a front face of the stripper plate 230. The vacuum assembly is designed to remove off-gasses that might otherwise accumulate within the system.

In some embodiments of the invention, the system comprises a temperature sensor effective to measure temperature of the change plate assembly 216. For example, the temperature sensor may include one or more surface monitoring thermocouples located at strategic locations on or within housing plates of the injection molding assembly. Like the vacuum assembly, the temperature sensor is preferably positioned and structured to become operable by default upon coupling of the change plate assembly to the injection molding assembly.

In accordance with yet another aspect of the invention, back curve insert 226 is preferably manufactured as one integral component. In other embodiments, not shown, the insert 226 may be a multi-component design.

In one specific embodiment, each of the first and second inserts 220 and 226, respectively, are single-piece inserts including the optical quality surfaces defining one of the front curve or back curve of the contact lens, and in addition, a circumferential surface, hereinafter sometimes "datum surface" that will define a lens edge when a first molded article is assembled with a second molded article produced using the methods and systems of the invention. Each of the first and second inserts 220 and 226, respectively define not only the optical surface of the lens to be made thereby but also the critical edges of a lens formed by the molding surfaces. In other embodiments, the inserts are multi-piece inserts.

The mold sections may be shaped so as to define the critical edge surfaces of the lens formed between two of the mold sections, thus possibly eliminating post production steps directed at polishing operations directed at smoothing the edge profile of the lens. This will be better understood with reference to FIGS. 10 and 11, wherein FIG. 10 shows an enlarged view of the corresponding molded surfaces of mold sections 10 and 10' as assembled to form the lens-shaped cavity 28 therebetween, and FIG. 11 is a magnified cross-sectional view of the corresponding datum surfaces of the inserts used to form both of the mold sections 10 and 10'.

Figure 10:
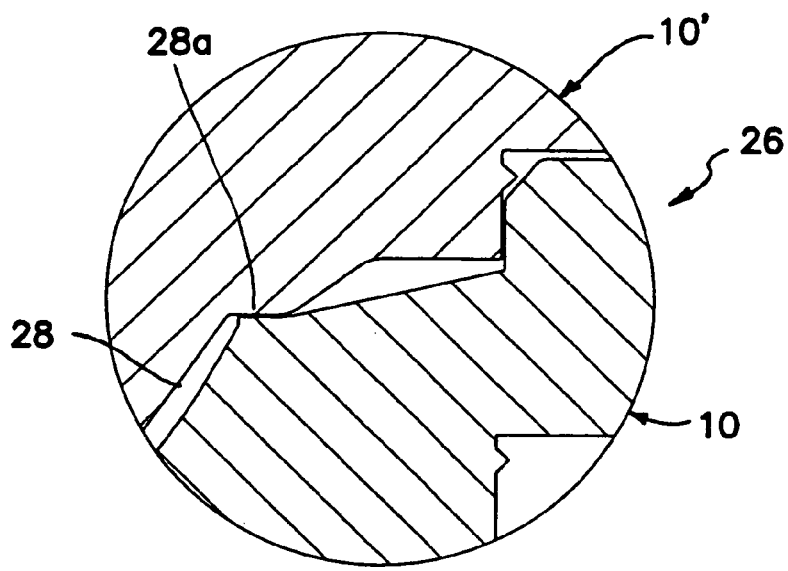
FIG. 10 is a magnified cross-sectional view of a portion of the mold assembly shown in FIG. 4, showing features of the mold sections that produce a smooth edged surface to the contact lens formed in the lens shaped cavity.
Figure 11:
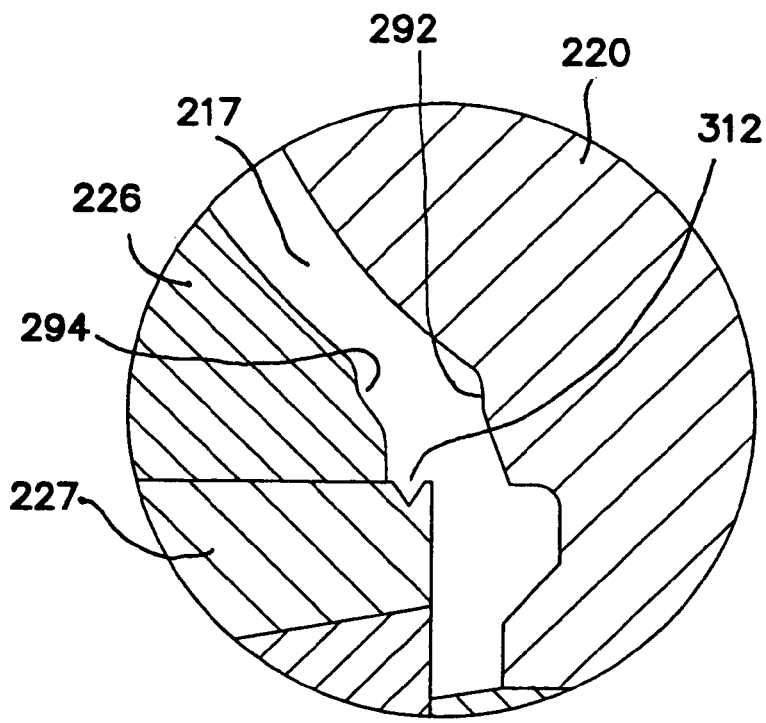
FIG. 11 is a magnified view of a portion of the mold cavity shown in FIG. 6 showing an undercut ring effective to cause the molded part to adhere to the back curve insert upon separation of the molding surfaces.

More specifically, FIG. 10 shows a rounded edge form 28a of the lens shaped cavity 28 of the molding assembly 26 made of identical mold sections 10 and 10'.

Figure 10A:
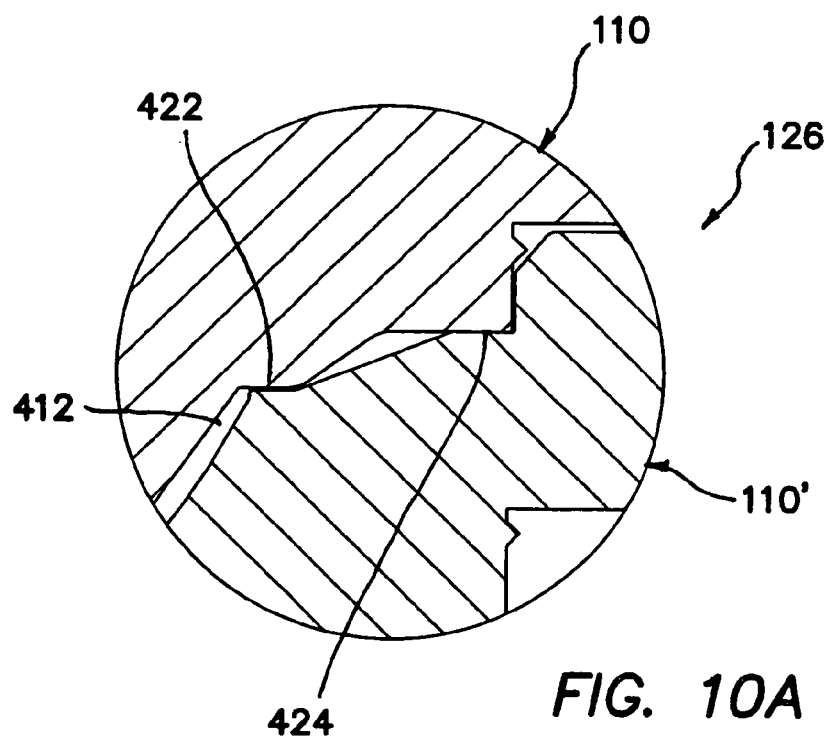
FIG. 10A is a magnified cross-sectional view of a portion of a preferred mold assembly including a feature to prevent deformation of a lens edge.

FIG. 10A is a view of a mold assembly 126 substantially identical to mold assembly 26. However, mold assembly 126 includes an additional feature directed at substantially preventing deformation of the lens edge 412 during welding of mold sections 110 and 110'. More specifically, mold assembly 126 includes a first contact region 422 located radially outwardly of the lens shaped cavity and a second contact region 424 located radially outwardly of and spaced apart from the first contact region 422.

In a mold assembly 126, the second contact region is positioned marginally away from the edge of the first contact region, or first mating surfaces. Thus, when the assembly 126 is loaded during welding only partial deformation of the edge, due to overloading, can occur (up to 20 μm i.e. the clearance) before contact of the secondary mating surfaces is made, transferring the force away from the edge of the lens and substantially preventing further deformation of it. These features are machined onto the one piece optic. Thus, it can be understood that the outwardly located contact point 424 is effective in reducing defects at the lens edge by relieving pressure from the lens edge contact point 422. Furthermore, it can be understood that the present mold sections are structured, or include structural elements, to relieve pressure at the lens edge contact point when two mold sections are placed together compared to mold sections that have only one contact point located at or near the lens edge. Thus, the present mold assemblies can be understood to comprise two mold sections that have two contact regions located around the circumference of the optical region of the mold section.

Turning to FIG. 11, each insert 220, 226 includes an optical quality surface defining one of the front curve or back curve of the contact lens, and in addition, a circumferential surface, hereinafter sometimes "datum surface" that defines a lens edge when the first molded article (e.g. mold section 10 in FIG. 4) is assembled with a substantially identical second molded article (e.g. mold section 10' in FIG. 4). Critical portions, hereinafter "datum surfaces" are provided on each of one piece optic inserts 220 and 226, at 292 and 294 respectively.

The datum faces 292 and 294 are preferably machined onto the inserts 220 by a specialist optical precision lathe. Consequently, the sagittal heights of the inserts are fixed, thus the center thickness of the contact lens molded thereby is fixed. Advantageously, no adjustment of the insert is necessary to obtain the correct center thickness of the contact lens.

Turning back to FIG. 6, cavity 217 is fed with molten thermoplastic material by a valve gate 302 of injection molding assembly 212. The valve gate 302 is disposed near an end of the elongated portion of the cavity, or "runner" 217a. The valve gate 302 is situated so as to inject the hot molding material into the runner 217a in a direction substantially perpendicular to a length of the runner 217a. Preferably, the inlet 304 has a diameter in the range of about 0.6 mm to about 1.6 mm, which allows for increased fill rates and less shearing of the thermoplastic material, thereby rendering a better optical quality surface. The valve gate 304 is also structured to substantially prevent gate vestige, that is, an amount of material that may attach to the molded article due to "gate drool." The gate size is selected so as to reduce shear stress in the molten thermoplastic material flowing through the cavity. Control of the gate size is accomplished by a pin which helps to control the flow rate of the molten thermoplastic, which (in conjunction with temperature and rate of heat removal) helps control the final dimensional characteristics of the molded part and optimizes the processing of the molded article.

In addition, the distance of the valve gate 302 to the optical portion of the mold cavity is sufficient to facilitate the use of sufficiently large cooling channels 272 around the bushings 222 and 232. This allows for very efficient, rapid cooling of the mold cavity 217b.

In a specific embodiment of the invention wherein the molding material is using EVOH and the melt temperature is at about 255° C., the injection speed is about 0.55 seconds, the cooling time is about 2.5 to about 5.5 seconds and the holding pressure in the system in the injection molding assembly is about 60 Bar. It should be appreciated that these values are provided for purposes of example only, and different embodiments of the invention may have different values of melt temperature, injection speed, cooling time, holding pressure, and/or other parameters. Such values can be changed to obtain the desired weight and radius consistency of the mold sections empirically by changing one parameter and determining how that change affected the properties of the mold sections. It may be desirable to produce universal mold sections that have a weight consistency having an error no greater than about 5% from mold section to mold section and/or a radius consistency having an error no greater than about 5%.

Mold section shaped cavity 217 is fed by the valve gate 302 through the runner 217a through a feed portion which has a substantially uniform width and depth. Downstream of the feed portion, the runner 217a diverges and fans outwardly in a direction toward the main, lens forming portion 217a of the mold section cavity 217. The runner 217a diverges at an angle of between about 10 degrees and 20 degrees from opposing longitudinal edges of the feed portion. In this diverging portion of the runner 217a, the cavity 217 is smaller in depth than feed portion, thereby forming the fan shaped, relatively thinner region 30 of the mold section 10 shown in FIG. 1.

The runner 217a (i.e. elongated portion) of the cavity 217 is dimensioned and the inlet 304 is sized and positioned to be effective to provide the resulting substantially solid molded article with higher optical quality surfaces, as defined elsewhere herein, relative to a molding apparatus including an identical molding tool without the elongated portion of the mold cavity.

The shape of the runner 217a, having an upstream portion that is uniform in width and a downstream portion that diverges in width, fulfills important functions. The generally fan-shaped downstream portion diverges gradually in width from an apex region toward the rest of the mold cavity where it feeds thermoplastic into the flange portion and optical portion of the cavity. Controlling the flow characteristics imparted by the dimensions of the runner, for example, in conjunction with the feed pressure, flow rate, and temperature of the molten thermoplastic and the rate of heat withdrawal therefrom, enables obtaining the desired characteristics of the completed mold section having at least one, and more preferably two, opposing optical surfaces on the single mold section. The dimensions of the runner are effective in reducing and preferably eliminating jetting of the flowing molten thermoplastic which could lead to sink marks, dimensional inconsistency, and unacceptable irregularities in the surface of the resulting mold section.

In accordance with another aspect of the invention, the back curve insert 226 is positioned on the moving component of the injection molding machine 210. This facilitates removal of the molded article from the injection molding tool, for example by means of a robotic handling device, using a single step rather than the multiple steps required if the front curve insert 220 were placed on the moving component of the injection molding tool.

In normal operation, the molded article would naturally adhere to the front curve insert 220 which includes a convex molding surface. In order to cause the molded article to instead be retained on the back curve insert 226, an effective mechanical structure on or within the molding surfaces may be employed. For example, turning to FIG. 10, the bushing 227 includes a circumferential groove 314 for retaining the molded article to the back curve insert 226. Groove 314 may be a single continuous undercut in the form of a substantially V-shaped groove, or may be a plurality of spaced apart grooves disposed along the perimeter of the bushing. For example, the groove 312 has a depth of between about 0.025 mm and about 0.5 mm, more preferably about 0.075 mm, and an incline angle of up to about 80°, preferably about an incline angle of about 45°. When molten material within the cavity 217 solidifies within the groove 312, the molded article will tend to be retained thereby and therefore remain adhered to the back curve insert 226, rather than front curve insert 220 when the molding machine is opened to reveal the molded article.

Figure 12:
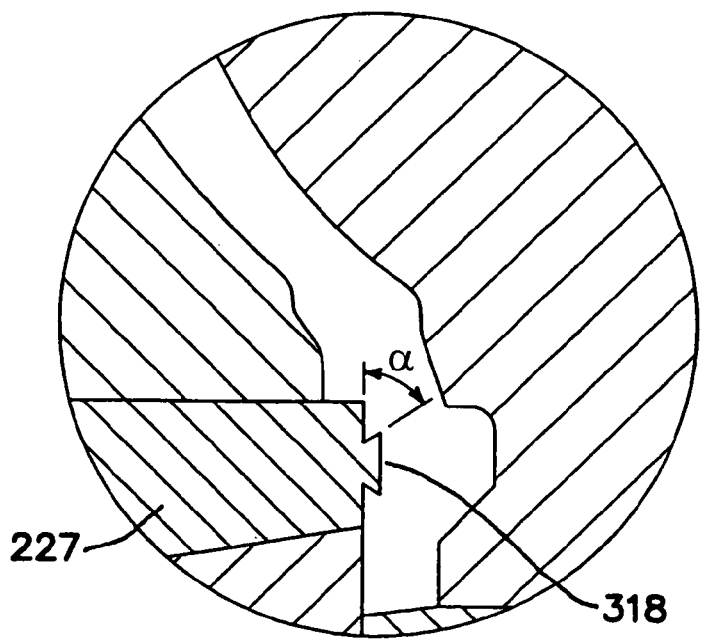
FIG. 12 is a magnified view of a portion of the mold cavity similar to the magnified view shown in FIG. 11, except rather than the notched portion, a "dovetail" form is provided for holding the molded part to the back curve insert upon separation of the molding surfaces.

Alternatively or additionally, a raised structure may be employed to be effective to cause the molded article to be retained by the back curve insert 226. For example, as shown in FIG. 12, a raised portion 318 in the form of a "dove tail" is provided. Like the groove 318 hereinabove described, the raised structure 318 may be a continuous circumferential structure, or alternatively may be intermittent or spaced apart. Preferably, one or more raised structures 318 are provided which do not define a complete circumferential recess or annulus. For example, the mold section formed or molded on this back curve insert will include for example, at least one non-circumferential recess, for example, three spaced apart recesses, within the flange surface on the back curve of the mold section.

Preferably, the raised structure 318 is disposed at two, three or more equidistantly spaced portions of the bushing, covering between about 10% to about 90% of a circumference thereof.

In one specific embodiment, the retaining mechanism comprises three equidistantly spaced raised structures 318 each defining an arc of about 30° about the circumference of the bushing. In this specific embodiment, the raised structure 318 has a height about 0.2 mm to about 0.5 mm, and a width of about 0.6 mm. The raised structure 318 defines opposing undercut angles $\alpha$ of between about 15° and about 85°, more preferably about 70°.

Removing the solidified mold section from the back curve insert is accomplished as follows. The core plate carrying the back curve inserts, for example 8 back curve inserts, is moved away from the cavity plate carrying the front curve inserts. The mold sections are retained on the back curve insert surfaces of the core plate, for example by means of retaining features described elsewhere herein. A vacuum assisted robot, which includes a plate having a substantially planar surface with a plurality of vacuum ports, and effector enters between the cavity plate and core plate. The vacuum ports, in this example 8 vacuum ports, on the plate are positioned to hold the mold sections when the robot plate contacts the exposed surfaces of the flange regions on the front curve side of the 8 mold sections. The vacuum ports draw and lift the mold sections away from the back curve insert surfaces in combination with the actions of the stripper plate moving relative to the optical inserts. The robot arm swings away from the core plate and the vacuum heads then release the mold sections, back curve side down, in a vertical stacking tray or cassette designed to hold stacked mold sections. In a specific embodiment, the cassette is sized and structured to hold a stack of 64×8 individual mold sections. Advantageously, the mold sections are stacked with the front curve side (concave side) facing upward which greatly facilitates the downstream filling steps.

Once the stacking cassette is full, the cassette is transferred to a separate fill and close area where the mold sections are mechanically unstacked from the cassette, filled with a contact lens precursor material, and closed with mating contact lens mold sections. The indicia located on the elongated region of each mold section can be read, for example, using a laser scanner device as described elsewhere herein, to ensure appropriate matching between mating mold sections during the stacking, unstacking, filling and/or closing steps.

In view of the disclosure herein, it can be understood that the present invention relates to contact lens mold sections, assemblies of mold sections, and systems and methods for producing contact lens mold sections.

In at least one embodiment, a contact lens mold section comprises two optically acceptable or optical quality lens defining surfaces, a flange substantially circumscribing the lens defining surfaces, and a elongate member in contact with the flange and extending radially away from the lens defining surfaces. Such mold sections may be understood to be universal molds having a handle portion. In other words, two substantially identical or exactly identical mold sections can be coupled together to form a mold assembly defining a lens-shaped cavity with a handle extending therefrom. In contrast, existing mold sections may include an extended portion but do not include two optical quality lens defining surfaces. In certain embodiments, the mold section includes a plurality of recesses located in the flange. The recesses may have an arc shape, but are not continuous annular recesses. Each mold section can be provided with multiple radially spaced apart contact points such that pressure of one mold section on a second mold section is reduced at the lens edge to reduce defects at the lens edge and minimize or eliminate further edge processing. The elongate member can include a machine-readable identifier to facilitate tracking and identification of particular lenses or mold sections during the manufacturing process.

Examples of the present systems for producing such contact lens mold sections comprise an injection molding assembly and a change plate assembly which defines a plurality of mold section cavities to produce mold sections as described herein. Unlike existing manufacturing systems, since the present mold sections have two optical quality surfaces, the heater of the injection molding assembly is not required to be located away from the optical quality surface. In other words, the heater can be located on either side of the mold section cavity. Furthermore, the change plate assembly can effectively and consistently produce contact lens mold sections without requiring a ramp surface or incline surface to control the properties of the flowing thermoplastic material.

From the foregoing description, it can also be appreciated that the at least one aspect of the present invention relates to methods of producing contact lenses. For example, certain embodiments are directed to a method of producing a plurality of contact lenses having different prescriptions. Such methods comprise producing a plurality of contact lens mold sections in a number of mold cavities, as described herein. Each contact lens mold section comprises a lens defining region having a first lens-defining surface which is a negative of an optical quality anterior surface of a contact lens, a substantially opposing second lens-defining surface which is a negative of an optical quality posterior surface of a contact lens, a flange region circumscribing the first and second lens-defining surfaces. The first lens-defining surface can have a first radius of curvature, and the second lens defining surface can have a second radius of curvature. The number of prescriptions for a batch of contact lenses is the square of the number of mold cavities.

As a specific example, if a contact lens mold manufacturing system comprises eight molding cavities, and each molding cavity has a front curve insert and a back curve insert, and each insert has a different curvature, sixty-four different lens powers can be obtained for contact lenses produced in such lens molds. For example, by pairing any one of the front curve inserts with any one of the back curve inserts, it is possible to produce multiple lens powers with little manufacturing down time due to insert set up or replacement. This is especially apparent when compared to injection molding systems that include mold cavities that all produce the same optical power.

In certain embodiments of the present methods, each mold cavity comprises a removable optical insert, and the number of prescriptions for the batch of contact lenses is obtained without removing the optical inserts.

The present methods can be understood to produce a one piece mold or universal mold. The various combinations of the front curve surfaces and back curves surfaces, with different radii of curvature, can result in the number of powers or lens prescriptions equaling the square of the number of molding cavities used to produce the one piece molds.

Certain aspects and advantages of the present invention may be more clearly understood and/or appreciated with reference to the following commonly owned United States Patent Applications, filed on even date herewith, the disclosure of each of which is being incorporated herein in its entirety by this specific reference: U.S. patent application Ser. No. 11/200,648, entitled "Contact Lens Mold Assemblies and Systems and Methods of Producing Same"; U.S. patent application Ser. No. 11/200,644, entitled "Systems and Methods for Producing Contact Lenses from a Polymerizable Composition"; U.S. patent application Ser. No. 11/201,410, entitled "Systems and Methods for Removing Lenses from Lens Molds"; U.S. patent application Ser. No. 11/200,863, entitled "Contact Lens Extraction/Hydration Systems and Methods of Reprocessing Fluids Used Therein"; U.S. patent application Ser. No. 11/200,862, entitled "Contact Lens Package"; U.S. Patent Application No. 60/707,029, entitled "Compositions and Methods for Producing Silicone Hydrogel Contact Lenses"; and U.S. patent application Ser. No. 11/201,409, entitled "Systems and Methods for Producing Silicone Hydrogel Contact Lenses".

A number of publications and patents have been cited hereinabove. Each of the cited publications and patents are hereby incorporated by reference in their entireties.

While this invention has been described with respect to various specific examples and embodiments, it is to be understood that the invention is not limited thereto and that it can be variously practiced within the scope of the following claims.

What is claimed is:

1. A method of producing a contact lens, comprising:
    directing a molten thermoplastic material into a mold cavity, thereby forming a first contact lens mold section comprising the thermoplastic material in the mold cavity, wherein
    the mold cavity comprises a first optical quality insert surface; an opposing second surface; a mold flange-defining region circumscribing the first optical quality insert surface and the second surface, the first optical quality insert surface and the second surface defining a first lens-defining surface and a second substantially opposing surface of a contact lens mold section; and an elongated channel extending substantially radially outwardly from the mold flange-defining region, the elongated channel including a first portion having a substantially uniform width and a second portion having a divergent width, the second portion being adjacent the flange-defining region and being thinner than the first portion of the elongated channel;
    providing a complementary second contact lens mold section;
    placing a polymerizable composition onto a concave lens defining surface of one of the first mold section or the second mold section;
    placing the other one of the first mold section or the second mold section on top of the one of the first mold section or the second mold section to enclose the composition within a lens shaped region defined therebetween;
    coupling together the first and second mold sections which define the lens-shaped region and contain the enclosed composition to form a mold assembly; and
    subjecting the mold assembly to polymerizing conditions to produce a polymer article in the shape of a contact lens.

2. The method of claim 1, further comprising providing first and second discrete regions along the elongated channel that have different roughnesses, and the first and second discrete regions are effective in forming indicia on the mold section.

3. The method of claim 2, wherein the first and second discrete regions are effective in forming machine readable indicia on the mold section.

4. The method of claim 1, wherein the first optical quality insert surface is a surface of an insert located in a first plate of a removable change plate assembly.

5. The method of claim 4, further comprising retaining the mold section formed in the mold cavity on one change plate when the first plate and second plate are separated from each other.

6. The method of claim 4, further comprising cooling the change plate assembly.

7. The method of claim 4, wherein the removable change plate assembly includes generally conical locator parts for facilitating positioning of the removable change plate assembly.

8. The method of claim 4, further comprising measuring the temperature of the removable change plate assembly.

9. The method of claim 1, wherein the first optical quality insert surface is a surface of a single piece insert.

10. The method of claim 1, wherein the second surface is a surface of a single piece insert.

11. The method of claim 1, further comprising causing the formed contact lens mold section to be retained on one of the first optical quality insert surface or the second surface.

12. The method of claim 11, wherein the causing step comprises using a retaining structure or mechanisms.

13. The method of claim 1, wherein the elongated channel has a length extending substantially radially outwardly from the mold flange-defining region which is at least as great as a diameter of the first optical quality insert surface.

14. The method of claim 13, wherein the length of the elongated channel is between 30 mm and 35 mm.

15. The method of claim 1, wherein the second surface comprises a second optical quality insert surface, and the second surface defines a second lens-defining surface substantially opposing the first lens-defining surface of the contact lens mold section.

16. The method of claim 15, wherein the second optical quality surface is a surface of an insert located in a second plate of the removable change plate assembly.

17. The method of claim 1, further comprising separating the complementary sections of the mold assembly to reveal the polymerized lens shaped article on the first mold section or the second mold section.

18. The method of claim 17, further comprising removing the polymerized lens shaped article from the first mold section or the second mold section.

19. The method of claim 1, wherein the elongated channel has a length to depth ratio of between 22:1 to 44:1.

* * * * *